United States Patent [19]
Toyoda et al.

[11] Patent Number: 4,902,929
[45] Date of Patent: Feb. 20, 1990

[54] ELECTROLUMINESCENT DEVICE CONTAINING ELECTROLUMINESCENT PARTICLES EACH COVERED WITH MOISTURE PROOF FILM

[75] Inventors: Masahiro Toyoda; Katsuhiko Tanaka, both of Kyoto, Japan

[73] Assignee: Murata Maunfacturing Co., Ltd., Japan

[21] Appl. No.: 190,716

[22] Filed: May 6, 1988

[30] Foreign Application Priority Data

| May 6, 1987 | [JP] | Japan | 62-110272 |
| May 6, 1987 | [JP] | Japan | 62-110273 |
| Jul. 13, 1987 | [JP] | Japan | 62-174354 |
| Jul. 13, 1987 | [JP] | Japan | 62-174355 |

[51] Int. Cl.⁴ ............................................. H01J 1/70
[52] U.S. Cl. .................... 313/503; 313/502; 313/506; 427/66; 427/214; 427/215; 427/220; 427/218; 427/219; 428/403
[58] Field of Search ............... 313/503, 504, 506, 502; 427/66, 215, 214, 218, 219, 220; 428/403, 405, 407

[56] References Cited

U.S. PATENT DOCUMENTS

| 2,944,177 | 7/1960 | Piper | 313/502 |
| 2,951,169 | 8/1960 | Faria et al. | 313/502 |
| 3,010,044 | 11/1961 | Cerulli | 313/502 |
| 3,649,383 | 3/1972 | Akasaki | 427/66 X |
| 4,717,590 | 1/1988 | Wolfe et al. | 427/219 X |

FOREIGN PATENT DOCUMENTS 40-28377 12/1965 Japan .
60-264095 12/1985 Japan .

Primary Examiner—Donald J. Yusko
Assistant Examiner—Michael Horabik
Attorney, Agent, or Firm—Ostrolenk, Faber, Gerb & Soffen

[57] ABSTRACT

An electroluminescent device comprises a luminous layer containing electroluminescent particles each covered with a moisture-proof film, which is formed by polymer, having network structure obtained by hydrolyzing metal alkoxide and causing polycondensation reaction. The moisture-proof film may contain pigment, or a film containing pigment may be formed to cover the electroluminescent particle.

5 Claims, 2 Drawing Sheets

ELECTROLUMINESCENT DEVICE CONTAINING ELECTROLUMINESCENT PARTICLES EACH COVERED WITH MOISTURE PROOF FILM

BACKGROUND OF THE INVENTION

1. Field of the Invention

The present invention relates to an electroluminescent device, and more particularly, it relates to an improvement in a luminous layer which emits light by application of an electric field.

2. Description of the Prior Art

An organic electroluminescent device, which is employed for displaying characters, graphics etc. or as a light source for a liquid crystal display, is generally formed by a back electrode of aluminum foil or the like, a reflecting insulation layer of an insulating material prepared by an organic dielectric substance mixed with powder of barium titanate etc., a luminous layer of an organic dielectric substance in which electroluminescent particles, or fluorescent particles, are dispersed, a transparent electrode and a transparent resin casing film. In such an electroluminescent device, AC voltage is applied across the back electrode and the transparent electrode to provide an AC electric field to the fluorescent particles contained in the luminous layer, thereby to excite the same for light emission.

It has been pointed out that luminance and life of such an electroluminescent device are extremely influenced by external conditions such as the value and the frequency of the AC voltage applied across the electrodes, as well as by internal conditions of the luminous layer, in particular, such as absorption of external moisture.

As the prior art for preventing reduction in luminance of an electroluminescent device and providing longer life, Japanese Patent Publication Gazette No. 28377/1965, for example, discloses an electroluminescent device which comprises a luminous layer containing fluorescent particles having surfaces covered with microcrystals of titanium oxide or barium titanate. Such titanium oxide or barium titanate incidentally serves as a moisture-proof material for protecting the fluorescent particles against external moisture. In this prior art example, the process of adhering the microcrystals of titanium oxide or the like to the surfaces of the fluorescent particles includes steps of mixing the fluorescent particles into a suspension of titanium oxide or the like and performing heat treatment under a high temperature (550 — 610° C.) thereby to manufacture a block containing the fluorescent particles, and thereafter pulverizing the same.

However, the fluorescent particles are deteriorated by the high temperature in the heat treatment step, while the surfaces thereof are partially uncovered and exposed by pulverization in the pulverizing step. Due to such problems, the fluorescent particles are ineffectively protected against moisture in practice, and hence the luminous layer cannot be satisfactorily prevented from reduction in luminance while its life cannot be sufficiently increased.

In order to solve such problems, Japanese Patent Laying-Open Gazette No. 264095/1985, for example, provides an electroluminescent device, in which the surfaces of fluorescent particles are covered with a moisture absorbent in place of the aforementioned moisture-proof material. As described in this gazette, external moisture is absorbed by the moisture absorbent to be prevented from penetration into the fluorescent particles for a considerably long time. Thus, the device is protected against the moisture for a long time, whereby the luminous layer can be prevented from reduction in luminance and its life can be increased.

In this prior art example, however, although the device can be protected against moisture until the amount of external moisture absorbed by the moisture absorbent reaches the maximum absorption volume, i.e., a so-called saturation level, the absorbed moisture is bled off toward the fluorescent particles after the amount of absorption reaches the saturation level to rapidly deteriorate the fluorescent particles. Thus, the life of the luminous layer cannot be basically increased by this prior art example.

SUMMARY OF THE INVENTION

The present invention contemplates solving the problem caused by the moisture bleeding action of the moisture absorbent by selecting a moisture-proof material as a coating material applied to the surfaces of electroluminescent particles as well as solving the aforementioned problems of the first described prior art example by eliminating the steps of high-temperature heat treatment and pulverization, which are generally required in the case of employing a moisture-proof material as a coating material, thereby to prevent a luminous layer from reduction in luminance and provide longer life.

The present invention is directed to an electroluminescent device which comprises a luminous layer containing electroluminescent particles each covered with a moisture-proof film. The luminous layer may accidentally contain two or more coalescent electroluminescent particles covered together by a moisture-proof film. The moisture-proof film is formed of a polymer which has network structure obtained by hydrolyzing metal alkoxide and causing polycondensation reaction. When, for example, the metal alkoxide is prepared by $Si(OR)_4$, where R represents an alkyl or phenyl group, provided is a moisture-proof film of a ceramic material having network structure expressed in a chemical formula $SiO_{2n}$ as the result of the aforementioned reaction.

According to the present invention, moisture-proof films are applied to cover electroluminescent particles, to cause no bleeding of absorbed moisture, which is generally derived from saturation of a moisture absorbent when the surfaces of the electroluminescent particles are covered with the moisture absorbent. Thus, the electroluminescent particles are prevented from rapid deterioration caused by such bleeding of absorbed moisture, whereby a luminous layer can be prevented from reduction in luminance and provided with longer life.

The moisture-proof film covering each of the electroluminescent particles is formed of a polymer which is obtained by reacting metal alkoxide. Therefore, a step of forming the polymer to cover the electroluminescent particle can be carried out under a low temperature. As the result, the electroluminescent particle can be prevented from deterioration caused by high-temperature heat treatment. Further, since the electroluminescent particles can be provided with separate polymer coating films, the generally required step of pulverizing a block containing the electroluminescent particles coated with the moisture-proof films can be eliminated. Consequently, the luminous layer can be prevented from reduction in luminance and provided with longer life, in such a point that the surfaces of the respective electroluminescent particles can be entirely coated with polymer coating films to sufficiently improve moisture resistance.

As a derivative effect of the present invention, the manufacturing cost can be reduced since no equipment for high-temperature heat treatment is required due to elimination of the step of high-temperature heat treatment.

Another derivative effect of the present invention is that thickness of the polymer coating films can be easily controlled.

In a preferred embodiment of the present invention, pigment having a specific surface color is applied in relation to electroluminescent particles, in order to obtain a luminescent color which is different from that specific to the electroluminescent particles. Such pigment is applied by dispersing the pigment in each moisture-proof film, forming a film containing the pigment between the surface of each electroluminescent particle and the moisture-proof film, or forming a film containing the pigment on the surface of the moisture-proof film.

Accordingly, an object of the present invention is to provide an improvement for preventing an electroluminescent device from reduction in luminance and providing longer life.

Another object of the present invention is to obtain electroluminescent particles which are provided with moisture-proof films, at a low manufacturing cost.

Still another object of the present invention is to provide an electroluminescent device comprising a luminous layer, which provides a luminescent color different from that specific to electroluminescent particles contained therein.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
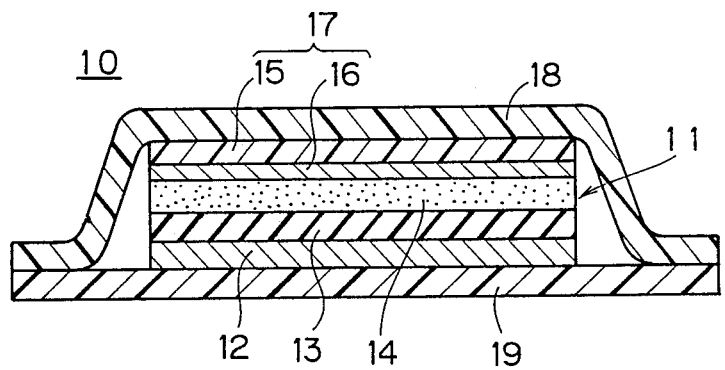
FIG. 1 is a sectional view showing an electroluminescent device according to an embodiment of the present invention.

Referring to FIG. 1, an electroluminescent device 10 is adapted to provide light on its upper side. This electroluminescent device 10 comprises a device body 11, which is formed by sequentially stacking a back electrode 12 of aluminum foil, for example, an insulation layer 13 of an organic dielectric substance mixed with powder of barium titanate or the like, a luminous layer 14 of an organic dielectric substance in which electroluminescent particles or fluorescent particles are dispersed and a transparent electrode 17 consisting of a transparent high polymer film 15 and an electrode film 16 of indium-tin oxide((ITO), for example, formed on the surface thereof. Upper and lower surfaces of such a device body 11 are respectively covered with transparent resin casing films 18 and 19, which are sealed to each other in respective outer peripheral portions.

When AC voltage is applied across the back electrode 12 and the transparent electrode 17, the insulation layer 13 advantageously functions to improve voltage resistance across the electrodes 12 and 17 as well as to uniformly apply an electric field to the luminous layer 14. In the absence of the insulation layer 13, the luminous layer 14 emits light when DC voltage is applied across the electrodes 12 and 17.

Figure 2:
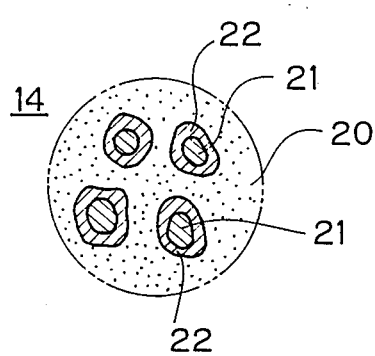
FIG. 2 is an enlarged sectional view showing composition of a luminous layer 14 as shown in FIG. 1.
Figure 3:
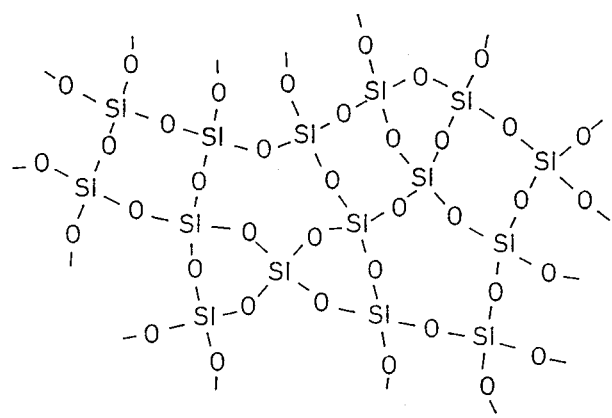
FIG. 3 illustrates an example of network structure given by the polymer.

FIG. 2 shows composition of the luminous layer 14 in an enlarged manner. This luminous layer 14 comprises a dielectric substance 20 such as cyanoethyl cellulose, and electroluminescent particles 21 are dispersed in the same. The electroluminescent particles 21 are prepared by particles of a fluorescent substance such as ZnS:Cu having a specific luminescent color of green. Each electroluminescent particle 21 is covered with a moisture-proof film 22 of a polymer This inorganic polymer is obtained by hydrolyzing metal alkoxide mainly composing of $Si(OR)_4$, for example, and causing polycondensation reaction, to provide network structure expressed in a chemical formula $SiO_{2n}$, as shown in FIG. 3. The aforementioned reaction of $Si(OR)_4$ is facilitated along the following reaction formulas (1) and (2), to form the network structure as shown in FIG. 3:

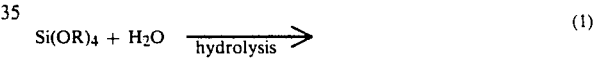

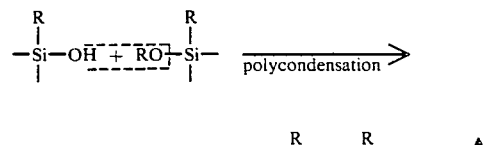
(1)

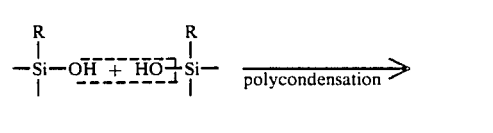
(2)

Polycondensation reaction in the above reaction formulas (1) and (2) proceeds by heating at a temperature of about 100° C., for example. The reaction expressed in the formula (1) and that in the formula (2) proceed in an inclusive state. As obvious from the above, reaction formulas (1) and (2), an alkyl or phenyl group R not shown in FIG. 3) is linked to each end of the network structure expressed in $SiO_{2n}$.

The aforementioned moisture-proof film 22 of the polymer can be obtained by advantageously utilizing a ceramic coating agent which is selected from the following commercially available ones:

I. Products of Japan Synthetic Rubber Co., Ltd.
  (1) "G90" (two liquid type ceramic coating agent adapted to form polymer coating mainly composed of $SiO_2$)
  (2) "G95" (two liquid type ceramic coating agent adapted to form polymer coating mainly composed of $SiO_2.TiO_2$)
  (3) "G401" (two liquid type ceramic coating agent adapted to form polymer coating mainly composed of $SiZrO_4$)

II. Products of Showa Denko K. K.
  (1) "GR-100" (ceramic coating agent of $Si(OR)_4$ with R of $CH_3$·$C_6H_5$ (2:1 in mole ratio))
  (2) "GR-650" (ceramic coating agent of $Si(OR)_4$ with R of $CH_3$)
  (3) "GR-908" (ceramic coating agent of $Si(OR)_4$ with R of $CH_3$:$C_6H_5$ (1:4 in mole ratio))
  (4) "GR-950" (ceramic coating agent of $Si(OR)_4$ with R of $C_6H_5$))

III. Products of Mitsubishi Metal Corporation
  Si-metal alkoxide ($Si(OR)_4$ with R of $C_2H_5$)

Description is now made on a method of forming the moisture-proof film 22 over the surface of each electroluminescent particle 21.

First, the surface of the electroluminescent particle 21 is so degreased that the ceramic coating agent for forming the moisture-proof or inorganic polymer film 22 is not shed by the said surface to cause defective adhesion of the moisture-proof film 22. The surface of the electroluminescent particle 21 may be degreased by a well-known method such as alkali treatment or blasting.

Then, the moisture-proof film 22 is formed on the degreased surface of the electroluminescent particle 21, by applying any of the aforementioned ceramic coating agents to the electroluminescent particle 21 by a well-known method such as spraying, dipping or rolling. At this time, thickness of the moisture-proof film 22 to be obtained can be controlled by adjusting the concentration of the ceramic coating agent. It has been recognized that the moisture-proof film 22 can be obtained in substantially uniform thickness by the ceramic coating agent. The ceramic coating agent forms the network structure containing silica as shown in FIG. 3, for example, by hydrolysis and polycondensation reaction under a temperature of about 100° C. As the result, the electroluminescent particle 21 is provided on its surface with the moisture-proof film 22, which is excellent in moisture resistance.

Then, the electroluminescent particle 21 provided with the moisture-proof film 22 is dried by heating at a temperature of 80° to 150° C. for about 30 minutes.

Thus, the surface of the electroluminescent particle 21 is completely covered with the moisture-proof film 22.

Figure 4:
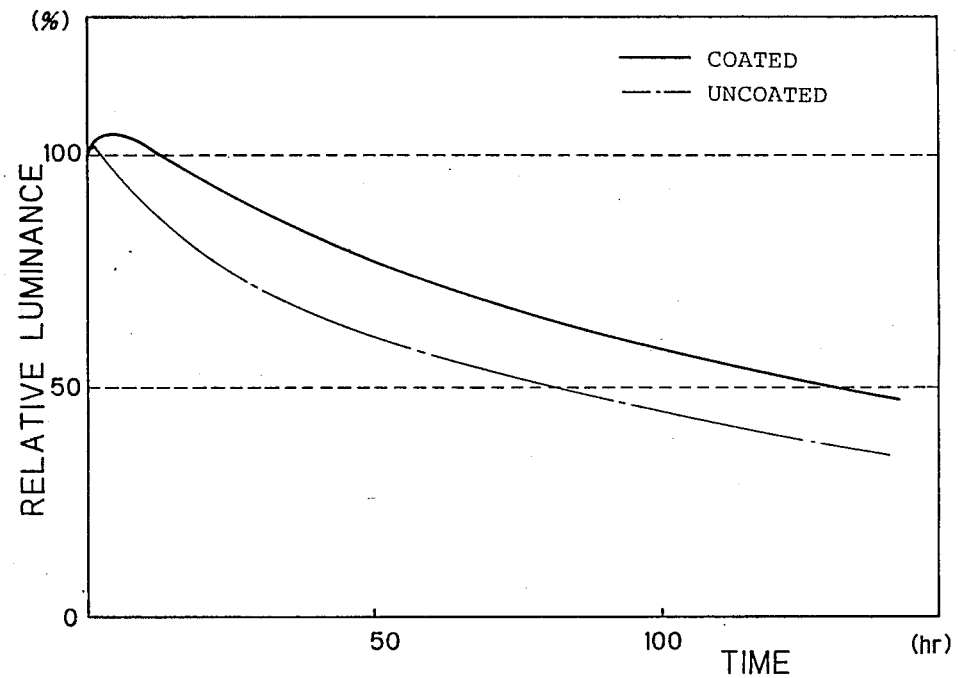
FIG. 4 is a graph showing time change in relative luminance through comparison of electroluminescent particles coated with moisture-proof films and uncoated electroluminescent particles.

FIG. 4 is a graph showing time change in relative luminance, with reference to electroluminescent devices 10 of the structure as shown in FIG. 1, which are provided with luminous layers 14 containing electroluminescent particles 21 coated with moisture-proof films 22 and uncoated electroluminescent particles 21. The data as shown in FIG. 4 are based on samples employing electroluminescent particles 21 of ZnS:Cu and moisture-proof films 22 prepared by the aforementioned ceramic coating agent "G90" by Japan Synthetic Rubber Co., Ltd. The respective samples were placed in an atmosphere having relative humidity of 90 % and a temperature of 50° C., and applied with AC pulses having peak voltage of 100 V and a frequency of 400 Hz, to emit light. FIG. 4 shows the time change of each sample in relative luminance, on the basis of luminance in an initial stage.

As shown in FIG. 4, the relative luminance is reduced with time in either case, while the degree of such reduction in relative luminance is low in the sample containing coated electroluminescent particles as compared with that containing uncoated ones.

Figure 5:
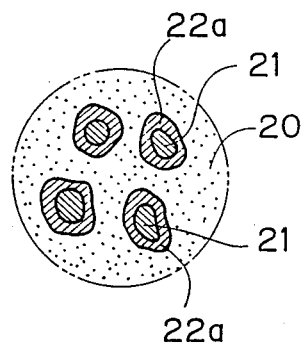
FIG. 5 illustrates another embodiment of the present invention by a sectional view corresponding to FIG. 2.

FIG. 5 illustrates another embodiment of the present invention by a sectional view corresponding to FIG. 2.

Referring to FIG. 5, moisture-proof films 22a for electroluminescent particles 21 are prepared by a ceramic coating agent, in which pigment is dispersed to differentiate the luminescent color of the luminous layer 14 as shown in FIG. 1 from that specific to the electroluminescent particles 21. Other structure of this embodiment is similar to that shown in FIG. 2, and hence corresponding elements are indicated by the same reference numerals, to omit redundant description.

Figure 6:
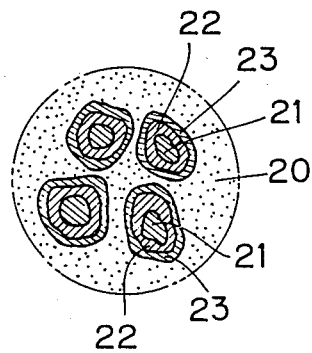
FIG. 6 illustrates still another embodiment of the present invention by a sectional view corresponding to FIG. 2.

FIG. 6 illustrates still another embodiment of the present invention by a sectional view corresponding to FIG. 2. In FIG. 6, elements corresponding to those in FIG. 2 are indicated by similar reference numerals, to omit redundant description.

Referring to FIG. 6, each moisture-proof film 22 is covered with a pigment film 23 containing pigment. The pigment film 23 is formed of an organic dielectric substance in which the pigment is dispersed.

In order to form such a pigment film 23, an organic binder in which the pigment is dispersed is prepared so that an electroluminescent particle 21 coated with the moisture-proof film 22 is dipped in the organic binder. Alternatively, the organic binder may be sprayed onto the electroluminescent particle 21 coated with the moisture-proof film 22. Thus, the organic binder is hardened to form the pigment film 23 of substantially uniform thickness on the moisture-proof film 22.

A dielectric substance 20 is formed of an organic binder, for example. In the process of manufacturing the electroluminescent device 10 as shown in FIG. 1, the luminous layer 14 is formed by printing, for example, in such a stage that the organic binder forming the dielectric substance 20 is not yet hardened. As hereinabove described, the pigment film 23 shown in FIG. 6 contains the organic binder, which may be brought into contact with the organic binder forming the dielectric substance 20 in the above described stage of forming the luminous layer 14. Therefore, if the organic binder contained in the pigment film 23 and that forming the dielectric substance 20 are dissolved by the same type of solvents, the organic binder contained in the pigment film 23 may be dissolved when the electroluminescent particle 21 is dispersed in the organic binder forming the dielectric substance 20. In order to avoid such inconvenience, the organic binder forming the dielectric substance 20 is preferably dissolved by a solvent which is different from that for dissolving the organic binder contained in the pigment film 23.

Figure 7:
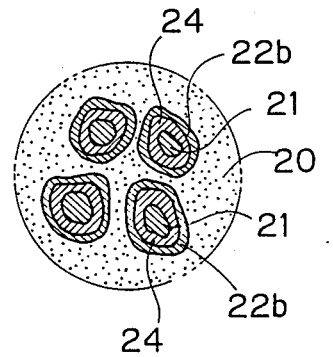
FIG. 7 illustrates a further embodiment of the present invention by a sectional view corresponding to FIG. 2.

FIG. 7 illustrates a further embodiment of the present invention by a sectional view corresponding to FIG. 2.

Referring to FIG. 7, a pigment film 24 is first formed over the surface of each electroluminescent particle 21. The pigment film 24 is substantially similar in composition to the pigment film 23 as shown in FIG. 6. Then a moisture-proof film 22b is formed on the surface of the pigment film 24. The moisture-proof film 22b is substantially similar in composition to the aforementioned moisture-proof film 22 as shown in FIG. 2, and hence the same can be formed by a similar method. Therefore, the surface of the pigment film 24 for forming the moisture-proof film 22b is degreased as pretreatment, if necessary.

The pigment contained in the moisture-proof film 22a as shown in FIG. 5 or that contained in the pigment film 23 or 24 as shown in FIG. 6 or 7 can be arbitrarily selected in response to a desired luminescent color to be obtained from the luminous layer 14, in relation to the luminescent color specific to the electroluminescent particle 21.

The pigment can be advantageously selected from the following commercially available ones:
I. Products of Nakarai Chemicals Ltd.
  (1) "Safranine" series such as Safranine T ($C_{20}H_{19}N_9Cl$; purple)
  (2) "Rhodamine" series such as Rhodamine B ($C_{28}H_{31}ClN_2O_3$; reddish purple)
II. Products of Merck and Company Incorporation
  "Eosin Bluish" ($C_{20}H_6Br_2N_2O_9Na_2$; blue)
III. Products of Sinloihi Company Ltd.
  "EA-001" (pink)
  "EA-005" (yellow)
  "EA-007" (pink)

Although the present invention has been described and illustrated in detail, it is clearly understood that the same is by way of illustration and example only and is not to be taken by way of limitation, the scope of the present invention being limited only by the terms of the appended claims.

What is claimed is:

1. An electroluminescent device comprising:
   emitter means containing electroluminescent particles; and
   means for applying an electric field to said emitter means,
   each of said electroluminescent particles being covered with a moisture-proof film of a hydrolyzed silicon alkoxide or phenoxide polycondensation polymer.

2. An electroluminescent device in accordance with claim 1, wherein pigment is dispersed in said moisture-proof film.

3. An electroluminescent device in accordance with claim 1, wherein said moisture-proof film is formed on the surface of each said electroluminescent particle.

4. An electroluminescent device in accordance with claim 3, further including a film containing pigment, said film containing pigment being formed on the surface of said moisture-proof film.

5. An electroluminescent device in accordance with claim 1, further including a film containing pigment formed on the surface of each said electroluminescent particle, said moisture-proof film being formed, on the surface of said film containing pigment.

* * * * *